3,322,682
RARE EARTH OXIDE AND VANADATE
PHOSPHORS
George L. Thompson, Geneva, Ill., assignor to American
Potash & Chemical Corporation, Los Angeles, Calif.,
a corporation of Delaware
No Drawing. Filed Apr. 23, 1965, Ser. No. 450,542
9 Claims. (Cl. 252—301.4)

This invention relates to luminescent substances. More particularly, this invention relates to novel rare earth-containing phosphors and to procedures for treating such phosphors whereby they emit brilliant color luminescence upon suitable excitation.

Various phosphors are known in the art. These include, for example, silver activated zinc sulfides and silver activated zinc-cadmium sulfides; such phosphors are used commercially in color television tubes. Moreover, those phosphors which exhibit electroluminescence, are used as cold light sources to produce striking effects when employed in interior decoration schemes and in information display devices.

The term "luminescence," as used in the present specification and claims, means the emission of visible light from a substance due to excitation of that substance.

The term "electroluminescence," as used in the present specification and claims, means the emission of visible light from a substance as a result of subjecting that substance to excitation by an electric field.

The term "photoluminescence," as used in the present specification and claims means the emission of visible light from a substance as a result of subjecting that substance to non-visible radiations or emissions. In general, such exciting radiation or emission has a wavelength shorter than about 4,000 angstroms. Cathode-rays are particularly suited for producing photoluminescence. The luminescence produced by cathode-rays is also sometimes known as cathodoluminescence or cathodphosphorescence.

The term "phosphor," as used in the specification and claims, refers to a substance comprised of a matrix and a dopant which substance is capable of exhibiting luminescence when subjected to appropriate excitation.

The luminescence emitted by many of the previously known phosphors was rather dull appearing. For many applications the dull luminescence of the prior phosphors was a decided disadvantage.

The present invention provides a new family of phosphors which exhibit brilliant luminescence upon excitation. Broadly, these phosphors comprise (1) a matrix composed of certain oxides (referred to hereinafter as "oxide phosphors") or certain vandates (referred to hereinafter as "vanadate phosphors") and (2) certain dopants.

More specifically, these phosphors comprise (1) a matrix selected from at least one of the group consisting of metal oxides and metal vanadates wherein said metal is one of the metallic tripositive ions yttrium, lanthanum or gadolinium; and (2) a dopant consisting of mixtures of europium and at least one of cerium, praseodymium, neodymium, samarium, gadolinium, terbium, dysprosium, holmium, erbium, thulium, ytterbium, lutetium, and lanthanum ions provided that each of said dopant ions is different from the trivalent yttrium, lanthanum or gadolinium metal ion in the matrix.

The oxide phosphors of this invention may conveniently be prepared from liquid admixtures containing the desired yttrium, lanthanum, and/or gadolinium matrix values together with the particularly selected dopant rare earth or thorium values. These liquid admixtures, in which these values conveniently are present, for example, as soluble nitrates, are treated to precipitate these values as the corresponding oxalates, hydroxides or carbonates. Such precipitation can be accomplished by treating the liquid admixtures with, for example, oxalic acid, ammonium hydroxide and ammonium carbonate, respectively. These precipitates are separated from their associated aqueous admixture and then ignited to the corresponding oxide by heating to at least about 1000° C. These oxides comprise the oxide phosphors of this invention.

Broadly, the vanadate phosphors of this invention are conveniently prepared by intimately admixing vanadium oxide with at least one of yttrium oxide, lanthanum oxide or gadolinium oxide and the oxides of the desired dopants. More specifically, in accordance with one aspect of the invention, all of the oxides except vanadium oxide are co-precipitated (as oxalates, hydroxides or carbonates) and ignited to the oxide as in the preparation of the oxide phosphors described above. The product of this co-precipitation and ignition may be considered as a pre-phosphor for the vanadate phosphor. An intimate admixture of vanadium oxide and the pre-phosphor oxides then is slowly heated to about 700° C., in an oxidizing atmosphere over a period of several hours followed by intense heating, still in an oxidizing atmosphere, for several additional hours at a temperature between about 1100° C. and 1300° C. The product of this second heating step is the desired vanadate phosphor.

Several of the rare earth dopants exhibit more than one valence state, for example, cerium, terbium and praseodymium exhibit both tri- and tetrapositive valences, and samarium, europium, and ytterbium exhibit both di- and tripositive valence states. Generally, the dopant ions cerium, terbium and praseodymium are tetrapositive and the dopant ions samarium, europium and ytterbium are tripositive, however, some of these dopant ions having other valence states may also be present in the phosphors of this invention. It will be understood by those skilled in the art that the terms "$Ce^{4+}$," "$Tb^{4+}$," "$Pr^{4+}$," "$Sm^{3+}$," "$Eu^{3+}$," and "$Yb^{3+}$" in the instant specification and appended claims include cerium, terbium and praseodymium ions having valences between three and four, and samarium, europium and ytterbium ions having valences between two and three.

In the specification, appended claims and the following examples, all parts and percentages are by weight unless otherwise indicated. The following examples are submitted to illustrate and not to limit the invention.

*Example I*

This example is illustrative of the preparation of the phosphors of this invention.

A solution containing one mole of yttrium nitrate hexahydrate, 0.003 mole of europium nitrate hexahydrate and 0.00005 mole of terbium nitrate hexahydrate is treated with two moles of oxalic acid at about 70° C. The resultant rare earth and yttrium oxalate precipitate which forms is filtered off, dried and fired, in an argon atmosphere, at a temperature of about 1000° C. The resultant oxide phosphor has (1) a $Y_2O_3$ matrix and (2) a dopant containing about 400 parts of $Eu^{3+}$ per million parts of yttrium and about 80 parts of $TB^{4+}$ per million parts yttrium. When excited by ultraviolet radiation having a wavelength of about 2,500 angstroms this oxide phosphor emits a brilliant red-orange luminescence.

*Example II*

This example is illustrative of the wide variation of brilliant colors obtainable by combining various rare earth dopants with a variety of rare earth oxide matrices to produce phosphors.

An oxide phosphor having (1) an yttrium oxide matrix and (2) a dopant containing about 400 parts of $Eu^{3+}$ per million parts of yttrium and about 400 parts of $Tb^{4+}$ per million parts of yttrium, prepared as described in Example I, is subjected to ultraviolet radiation having a wavelength of about 2,500 angstroms. The phosphor exhibits a brilliant pink luminescence.

Using the general procedure described in Example I, above, a number of oxide and vanadate phosphors were prepared having the (1) matrix and (2) dopant composition set forth in Table I, below, the phosphors exhibit the brilliant luminescent colors noted in the table.

TABLE I

| Color | Matrix | Dopant | | |
|---|---|---|---|---|
| | | $Tb^{4+}$, p.p.m.[1] | $Pr^{4+}$, p.p.m.[1] | $Eu^{3+}$, p.p.m.[1] |
| Red | $Y_2O_3$ | | 400 | 50,000 |
| Red | $Y_2O_3$ | 200 | | 50,000 |
| Orange-Pink | $Y_2O_3$ | 200 | | 400 |
| Red | $YVO_4$[2] | 100 | | 400 |
| Red | $YVO_4$[2] | | 500 | 50,000 |
| Pink | $Y_2O_3$ | 300 | | 300 |

[1] Parts of the dopant metal ion per million parts of the metallic tripositive yttrium, lanthanum or gadolinium ions present in the matrix.

[2] This phosphor is prepared by slowly heating an intimate admixture of finely divided $V_2O_5$, $Y_2O_3$, $Tb_2O_3$ and $Eu_2O_3$ to a temperature of about 700° C. in an oxidizing atmosphere over a 16 hour period. The product of this heating step is crushed and leached with dilute ammonium hydroxide to remove excess $V_2O_5$. The leached product is dried and heated in air at a temperature of about 1,300° C., for a period of about 12 hours. In the second of these phosphors $Pr_6O_{11}$ is substituted for $Tb_2O_3$.

*Example III*

This example is illustrative of the variety of brilliant lighting effects obtainable by varying the dopants associated with an yttrium oxide matrix in the oxide phosphors of this invention. These oxide phosphors are prepared by the procedure described in Example I.

Brilliant luminescence is exhibited under cathode-ray excitation by a series of oxide phosphors each having an yttrium oxide matrix and the following respective dopants: a mixture of 3,500 p.p.m. $Eu^{3+}$ and 85 p.p.m. $Gd^{3+}$; a mixture of 4,000 p.p.m. $Eu^{3+}$ and 100 p.p.m. $Pr^{4+}$; a mixture of 4,000 p.p.m. $Eu^{3+}$ and 85 p.p.m. $Nd^{3+}$; a mixture of 4,000 p.p.m. $Eu^{3+}$ and 100 p.p.m. $Ce^{4+}$; and a mixture containing 3,000 p.p.m. $Eu^{3+}$, 85 p.p.m. $Ce^{4+}$, 85 p.p.m. $Nd^{3+}$ and 85 p.p.m. $Pr^{4+}$.

*Example IV*

This example is illustrative of the brilliant lighting effects exhibited by vanadate phosphors composed of various dopants in an yttrium, gadolinium or lanthanum vanadate matrix.

The vanadate phosphors of this example are prepared according to the procedure described in a footnote to Table I in Example II above.

Exceptionally brilliant luminescence is exhibited by a $YVO_4$ phosphor containing 3 weight percent $Eu^{3+}$ and 100 p.p.m. of $Pr^{4+}$. A $YVO_4$ phosphor containing 3 weight percent $Eu^{3+}$ and 100 p.p.m. of $Tb^{4+}$ luminesces brilliantly.

One vanadate phosphor which luminesces brilliantly contains (1) a matrix of $YVO_4$ and (2) a dopant comprising a mixture of 3 weight percent $Eu^{3+}$, 100 p.p.m. $Ce^{4+}$, 40 p.p.m. $Pr^{4+}$, 130 p.p.m. $Nd^{3+}$, 150 p.p.m. $Sm^{3+}$, 1570 p.p.m. $Gd^{3+}$, 200 p.p.m. $Tb^{4+}$, 290 p.p.m. $Dy^{3+}$, 10 p.p.m. $Ho^{3+}$, 150 p.p.m. $Er^{3+}$, 10 p.p.m. $Tm^{3+}$ and 50 p.p.m $Yb^{3+}$.

One vanadate phosphor which luminesces brilliantly contains (1) a matrix of $YVO_4$ and (2) a dopant comprising a mixture of 4 weight percent $Eu^{3+}$, 100 p.p.m. $Ce^{4+}$, 200 p.p.m. $Pr^{4+}$, 100 p.p.m. $Nd^{3+}$, 150 p.p.m. $Sm^{3+}$, 200 p.p.m. $Tb^{4+}$ and 30 p.p.m. $Dy^{3+}$.

A $LaVO_4$ phosphor containing 4 weight percent $Eu^{3+}$ and 100 p.p.m. each of $Pr^{4+}$ and $Tb^{4+}$ luminesces brilliantly.

*Example V*

This example is illustrative of various phosphors which have mixed matrices. A pre-phosphor is prepared by intimately admixing, as a part of the matrix, 45 weight percent $Y_2O_3$ and 45 weight percent $La_2O_3$ and, as the dopant, 10 weight percent $Eu_2O_3$ and 100 parts of $Tb^{4+}$ per million parts of combined yttrium and lanthanum. This admixture then is mixed with an equal weight of $V_2O_5$ which comprises the remainder of the matrix. The resulting mixture is fired in air at a temperature of about 700° C. for a period of about 16 hours. The resulting vanadate phosphor exhibits brilliant red cathodoluminescence.

This example is repeated using a pre-phosphor composed of, as a part of the matrix, 45 weight percent $La_2O_3$ and 45 weight percent $Gd_2O_3$ and, as the dopant, 10 weight percent $Eu_2O_3$ containing 100 p.p.m. $Pr^{4+}$. This prephosphor is admixed with an equal weight of $V_2O_5$ and fired for a period of 12 hours at 700° C. to give a phosphor which exhibits brilliant red cathodoluminescence.

Repetition of Example V substituting $Gd_2O_3$ for $La_2O_3$ results in a phosphor which exhibits brilliant red cathodoluminescence. Excellent phosphors may be obtained using any one of the combined matrices: $Y_2O_3$—$La_2O_3$, $Y_2O_3$—$Gd_2O_3$, $Gd_2O_3$—$La_2O_3$, $Y$—$LaVO_4$, $La$—$GdVO_4$, $Gd$—$YVO_4$, $Y_2O_3$—$YVO_4$, $La_2O_3$—$LaVO_4$, and $Y_2O_3$—$La_2O_3$—$YVO_4$—$LaVO_4$.

A wide variety of dopants and combinations of dopants can be used in the phosphors of this invention. As shown in the examples, above, preferred dopants and combinations of dopants are as follows: mixtures of $Tb^{4+}$ and $Eu^{3+}$, mixtures of $Eu^{3+}$ and $Gd^{3+}$, mixtures of $Eu^{3+}$ and $Tb^{4+}$, mixtures of $Eu^{3+}$ and $Pr^{4+}$, mixtures of $Eu^{3+}$ and $Nd^{3+}$, mixtures of $Eu^{3+}$ and $Ce^{4+}$, and the like.

Particularly preferred phosphors are those having $YVO_4$ or $Y_2O_3$ matrices doped with from about 1 to 10 weight percent of $Eu^{3+}$ and from 10 p.p.m. to 1,000 p.p.m. of at least one of $Ce^{4+}$, $Pr^{4+}$, $Nd^{3+}$, $Sm^{3+}$, $Gd^{3+}$, $Tb^{4+}$, $Dy^{3+}$, $Ho^{3+}$, $Er^{3+}$, $Tm^{3+}$, $Yb^{3+}$, $Lu^{3+}$, or $La^{3+}$. These phosphors generally luminesce with a brilliant red color which makes them particularly suitable for use in color television tubes. A particularly preferred phosphor is that having a $YVO_4$ matrix doped with from 1 to 10 weight percent of $Eu^{3+}$ and from 10 p.p.m. to 1,000 p.p.m. of $Tb^{4+}$ or $Pr^{4+}$. This phosphor exhibits a particularly brilliant red luminescence when excited with cathode rays.

While the luminescence exhibited by the phosphors of this invention is generally brilliant appearing to the eye, the luminescence of some phosphors is noticeably more brilliant than that of others. The level of brilliance differs somewhat with the concentration of the dopants in any given matrix, and for different combinations of dopants and matrices.

In general, the concentration of the combined dopants in a phosphor should not exceed about 45 percent by weight of the phosphor. Concentrations of dopants in excess of this amount generally tend to dull the brilliance of the phosphors luminescence.

Generally, no substantial advantages are obtained by using any single dopant in concentrations exceeding about 100,000 p.p.m. (10 weight percent). The dopants generally are not effective in concentrations below about one part per million. Admixtures of dopants may advantageously contain several dopants each of which is present in concentrations up to 10,000 p.p.m. or more.

Preferably both the matrix and dopant materials used in these phosphors should be of relatively high purity. In general, the amounts of impurities should represent less than about one weight percent, and preferably less than 0.01 weight percent of the phosphor.

As will be understood by those skilled in the art, what has been described is the preferred embodiment of the invention; however, many modifications, changes and substitutions can be made therein without departing from the scope and the spirit of the following claims.

What is claimed is:
1. A phosphor consisting essentially of:
   (1) a matrix selected from at least one of the group consisting of yttrium oxide, lanthanum oxide, gadolinium oxide, yttrium vanadate, lanthanum vanadate, and gadolinium vanadate, and
   (2) a dopant consisting of from 1 to 10 weight percent of europium and from 10 p.p.m. to 1,000 p.p.m. of at least one of cerium, praseodymium, neodymium, samarium, gadolinium, terbium, dysprosium, holmium, erbium, thulium, ytterbium, lutetium and lanthanum ions, each of said dopant ions being different from the metallic ion of said matrix.
2. A phosphor which consists essentially of: a $Y_2O_3$ matrix and a dopant consisting of from 1 to 10 weight percent of europium and from 10 p.p.m. to 1,000 p.p.m. of terbium.
3. A phosphor which consists essentially of: a $Y_2O_3$ matrix and a dopant consisting of from 1 to 10 weight percent of europium and from 10 p.p.m. to 1,000 p.p.m. of praseodymium.
4. A phosphor which consists essentially of: a $YVO_4$ matrix and a dopant consisting of from 1 to 10 weight percent of europium and from 10 p.p.m. to 1,000 p.p.m. of praseodymium.
5. A phosphor which consists essentially of: a $YVO_4$ matrix and a dopant consisting of from 1 to 10 weight percent of europium and from 10 p.p.m. to 1,000 p.p.m. of terbium.
6. A phosphor which consists essentially of: a $LaVO_4$ matrix and a dopant consisting of from 1 to 10 weight percent of europium and from 10 p.p.m. to 1,000 p.p.m. of praseodymium.
7. A phosphor which consists essentially of: a $GdVO_4$ matrix and a dopant consisting of from 1 to 10 weight percent of europium and from 10 p.p.m. to 1,000 p.p.m. of praseodymium.
8. A phosphor which consists essentially of: a La—$YVO_4$ matrix and a dopant consisting of from 1 to 10 weight percent of europium and from 10 p.p.m. to 1,000 p.p.m. of praseodymium.
9. A phosphor which consists essentially of: a La—$YVO_4$ matrix and a dopant consisting of from 1 to 10 weight percent of europium and from 10 p.p.m. to 1,000 p.p.m. of terbium.

References Cited
UNITED STATES PATENTS

| | | | |
|---|---|---|---|
| 3,152,085 | 10/1964 | Ballman et al. | 252—301.4 |
| 3,186,950 | 1/1965 | Borchardt | 252—301.4 |
| 3,233,189 | 2/1966 | Guggenheim et al. | 252—301.4 |

FOREIGN PATENTS 1,347,458  11/1963  France.

OTHER REFERENCES

Kroger—Some Aspects of the Luminescence of Solids—Elsevier Pub. Co., New York, 1948, pp. 291, 292, 294, and 297.

Ropp—Spectral Properties of Rare Earth Oxide Phosphors—Journal of the Electrochemical Society, volume 111, No. 3, pp. 311–17, 1964.

TOBIAS E. LEVOW, *Primary Examiner.*

R. D. EDMONDS, *Assistant Examiner.*